United States Patent
Hoeink et al.

(10) Patent No.: US 10,577,924 B2
(45) Date of Patent: Mar. 3, 2020

(54) PERFORMING AN ACTION AT A WELLBORE OPERATION BASED ON ANONYMIZED DATA

(71) Applicants: Tobias Hoeink, Houston, TX (US); Colleen Barton, Portola Valley, CA (US)

(72) Inventors: Tobias Hoeink, Houston, TX (US); Colleen Barton, Portola Valley, CA (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 10 days.

(21) Appl. No.: 15/947,412

(22) Filed: Apr. 6, 2018

(65) Prior Publication Data
US 2019/0309620 A1    Oct. 10, 2019

(51) Int. Cl.
*E21B 47/12* (2012.01)
*H04L 29/06* (2006.01)
*H04L 9/08* (2006.01)

(52) U.S. Cl.
CPC .......... *E21B 47/12* (2013.01); *H04L 9/08* (2013.01); *H04L 63/0428* (2013.01)

(58) Field of Classification Search
CPC ........ E21B 47/12; H04L 9/08; H04L 63/0428
USPC ...................................... 340/853.1
See application file for complete search history.

(56) References Cited

U.S. PATENT DOCUMENTS

| | | | |
|---|---|---|---|
| 9,097,096 B1* | 8/2015 | Selman | E21B 44/00 |
| 2014/0169127 A1* | 6/2014 | Orban | G01V 1/40 367/25 |
| 2015/0112949 A1* | 4/2015 | Marland | G06Q 10/0639 707/688 |
| 2017/0168179 A1* | 6/2017 | Lemarenko | G01V 1/282 |

OTHER PUBLICATIONS

Hoeink, et al. "Shale Discrimination with Machine Learning Methods", American Rock Mechanics Association (ARMA) 17-769; Jun. 28, 2017; 6 pages.

* cited by examiner

*Primary Examiner* — Albert K Wong
(74) *Attorney, Agent, or Firm* — Cantor Colburn LLP

(57) ABSTRACT

Examples of techniques for anonymizing data are disclosed. In one example implementation according to aspects of the present disclosure, a computer-implemented method includes receiving, by a processing device, raw data from a wellbore operation. The raw data can be associated with depths. The method further includes anonymizing, by the processing device, the raw data to convert the raw data to anonymized data. One or more techniques can be implemented to anonymize the data, such as shuffling the raw data, normalizing the raw data, and/or non-dimensionalizing the raw data. The method further includes analyzing, by the processing device, the anonymized data. The method further includes performing an action at the wellbore operation based at least in part on the analysis of the anonymized data.

15 Claims, 13 Drawing Sheets

| Depth [m] | Gamma [gAPI] | Density [g/cm3] | Resistivity [Ohm m] | Lithology (binary) | Lithology (multi-class) |
|---|---|---|---|---|---|
| 2207.65 | 74.0164 | 2.4275 | 1.1366 | 0 | 2 |
| 2207.90 | 77.5678 | 2.417 | 1.0733 | 0 | 2 |
| 2208.15 | 61.7979 | 2.4625 | 1.1087 | 0 | 2 |
| 2208.40 | 49.2306 | 2.4667 | 1.4147 | 0 | 2 |
| 2208.65 | 34.5303 | 2.4789 | 1.9311 | 0 | 2 |
| 2208.90 | 37.6087 | 2.4582 | 2.2709 | 0 | 2 |
| 2209.15 | 33.4406 | 2.4847 | 2.4528 | 0 | 2 |
| 2209.40 | 33.8688 | 2.5121 | 2.5587 | 0 | 2 |
| 2209.65 | 31.6868 | 2.5116 | 2.4658 | 1 | 1 |
| 2209.90 | 37.6704 | 2.5152 | 2.3966 | 1 | 1 |
| 2210.15 | 34.7358 | 2.4991 | 2.4631 | 1 | 1 |
| 2210.40 | 30.7475 | 2.5008 | 2.6233 | 1 | 1 |
| 2210.65 | 30.8647 | 2.5304 | 2.7736 | 1 | 1 |
| 2210.90 | 35.7699 | 2.5152 | 2.7825 | 1 | 1 |
| 2211.15 | 34.0483 | 2.4891 | 2.6985 | 1 | 1 |
| 2211.40 | 28.5106 | 2.4756 | 2.664 | 1 | 1 |
| 2211.65 | 27.8305 | 2.4715 | 2.6679 | 0 | 3 |
| 2211.90 | 26.5578 | 2.4744 | 2.6812 | 0 | 3 |
| 2212.15 | 23.0839 | 2.4763 | 2.7724 | 0 | 3 |
| 2212.40 | 22.9624 | 2.539 | 2.964 | 0 | 3 |
| 2212.65 | 30.115 | 2.5166 | 3.0955 | 0 | 3 |
| 2212.90 | 34.2877 | 2.543 | 3.0931 | 0 | 3 |
| 2213.15 | 40.1936 | 2.4916 | 3.0396 | 0 | 3 |
| 2213.40 | 40.8869 | 2.5695 | 3.0131 | 0 | 3 |
| 2213.65 | 42.8484 | 2.5628 | 3.012 | 1 | 1 |
| 2213.90 | 50.9964 | 2.5292 | 2.9741 | 1 | 1 |
| 2214.15 | 47.8558 | 2.5028 | 2.9632 | 1 | 1 |
| 2214.40 | 41.6982 | 2.4954 | 3.1032 | 1 | 1 |
| 2214.65 | 28.0292 | 2.5151 | 3.2321 | 1 | 1 |
| 2214.90 | 26.9668 | 2.538 | 3.0864 | 1 | 1 |
| 2215.15 | 31.4463 | 2.5065 | 2.8021 | 1 | 1 |

*FIG. 5A*

| Gamma [gAPI] | Density [g/cm3] | Resistivity [Ohm m] | Lithology (binary) | Lithology (multi-class) |
|---|---|---|---|---|
| 34.0483 | 2.4891 | 2.6985 | 1 | 1 |
| 61.7979 | 2.4625 | 1.1087 | 0 | 2 |
| 28.5106 | 2.4756 | 2.664 | 1 | 1 |
| 41.6982 | 2.4954 | 3.1032 | 1 | 1 |
| 33.4406 | 2.4847 | 2.4528 | 0 | 2 |
| 34.7358 | 2.4991 | 2.4631 | 1 | 1 |
| 33.8688 | 2.5121 | 2.5587 | 0 | 2 |
| 49.2306 | 2.4667 | 1.4147 | 0 | 2 |
| 77.5678 | 2.417 | 1.0733 | 0 | 2 |
| 74.0164 | 2.4275 | 1.1366 | 0 | 2 |
| 28.0292 | 2.5151 | 3.2321 | 1 | 1 |
| 22.9624 | 2.539 | 2.964 | 0 | 3 |
| 27.8305 | 2.4715 | 2.6679 | 0 | 3 |
| 40.8869 | 2.5695 | 3.0131 | 0 | 3 |
| 30.8647 | 2.5304 | 2.7736 | 1 | 1 |
| 50.9964 | 2.5292 | 2.9741 | 1 | 1 |
| 37.6704 | 2.5152 | 2.3966 | 1 | 1 |
| 35.7699 | 2.5152 | 2.7825 | 1 | 1 |
| 42.8484 | 2.5628 | 3.012 | 1 | 1 |
| 37.6087 | 2.4582 | 2.2709 | 0 | 2 |
| 23.0839 | 2.4763 | 2.7724 | 0 | 3 |
| 40.1936 | 2.4916 | 3.0396 | 0 | 3 |
| 26.9668 | 2.538 | 3.0864 | 1 | 1 |
| 47.8558 | 2.5028 | 2.9632 | 1 | 1 |
| 34.2877 | 2.543 | 3.0931 | 0 | 3 |
| 31.4463 | 2.5065 | 2.8021 | 1 | 1 |
| 31.6868 | 2.5116 | 2.4658 | 1 | 1 |
| 30.7475 | 2.5008 | 2.6233 | 1 | 1 |
| 30.115 | 2.5166 | 3.0955 | 0 | 3 |
| 34.5303 | 2.4789 | 1.9311 | 0 | 2 |
| 26.5578 | 2.4744 | 2.6812 | 0 | 3 |

| Depth [m] | Density [g/cm3] | Gamma [gAPI] | Resistivity [Ohm m] | Lithology (binary) | Lithology (multi-class) | Lithology |
|---|---|---|---|---|---|---|
| 2207.65 | 2.4275 | 74.0164 | 1.1366 | 0 | 2 | Sandstone |
| 2207.90 | 2.417 | 77.5678 | 1.0733 | 0 | 2 | Sandstone |
| 2208.15 | 2.4625 | 61.7979 | 1.1087 | 0 | 2 | Sandstone |
| 2208.40 | 2.4667 | 49.2306 | 1.4147 | 0 | 2 | Sandstone |
| 2208.65 | 2.4789 | 34.5303 | 1.9311 | 0 | 2 | Sandstone |
| 2208.90 | 2.4582 | 37.6087 | 2.2709 | 0 | 2 | Sandstone |
| 2209.15 | 2.4847 | 33.4406 | 2.4528 | 0 | 2 | Sandstone |
| 2209.40 | 2.5121 | 33.8688 | 2.5587 | 1 | 1 | Shale |
| 2209.65 | 2.5116 | 31.6868 | 2.4658 | 1 | 1 | Shale |
| 2209.90 | 2.5152 | 37.6704 | 2.3966 | 1 | 1 | Shale |
| 2210.15 | 2.4991 | 34.7358 | 2.4631 | 1 | 1 | Shale |
| 2210.40 | 2.5008 | 30.7475 | 2.6233 | 1 | 1 | Shale |
| 2210.65 | 2.5304 | 30.8647 | 2.7736 | 1 | 1 | Shale |
| 2210.90 | 2.5152 | 35.7699 | 2.7825 | 1 | 1 | Shale |
| 2211.15 | 2.4891 | 34.0483 | 2.6985 | 1 | 1 | Shale |
| 2211.40 | 2.4756 | 28.5106 | 2.664 | 1 | 1 | Shale |
| 2211.65 | 2.4715 | 27.8305 | 2.6679 | 0 | 3 | Limestone |
| 2211.90 | 2.4744 | 26.5578 | 2.6812 | 0 | 3 | Limestone |
| 2212.15 | 2.4763 | 23.0839 | 2.7724 | 0 | 3 | Limestone |
| 2212.40 | 2.539 | 22.9624 | 2.964 | 0 | 3 | Limestone |
| 2212.65 | 2.5166 | 30.115 | 3.0955 | 0 | 3 | Limestone |
| 2212.90 | 2.543 | 34.2877 | 3.0931 | 0 | 3 | Limestone |
| 2213.15 | 2.4916 | 40.1936 | 3.0396 | 0 | 3 | Limestone |
| 2213.40 | 2.5695 | 40.8869 | 3.0131 | 1 | 1 | Shale |
| 2213.65 | 2.5628 | 42.8484 | 3.012 | 1 | 1 | Shale |
| 2213.90 | 2.5292 | 50.9964 | 2.9741 | 1 | 1 | Shale |
| 2214.15 | 2.5028 | 47.8558 | 2.9632 | 1 | 1 | Shale |
| 2214.40 | 2.4954 | 41.6982 | 3.1032 | 1 | 1 | Shale |
| 2214.65 | 2.5151 | 28.0292 | 3.2321 | 1 | 1 | Shale |
| 2214.90 | 2.538 | 26.9668 | 3.0864 | 1 | 1 | Shale |
| 2215.15 | 2.5065 | 31.4463 | 2.8021 | 1 | 1 | Shale |

*FIG. 6A*

| Depth | Density | Gamma | Resistivity | Lithology (bin) | Lithology (multi) | Lithology |
|---|---|---|---|---|---|---|
| 2207.65 | 0.2125 | 0.3701 | 0.3517 | 0 | 2 | Sandstone |
| 2207.90 | 0.1950 | 0.3878 | 0.3321 | 0 | 2 | Sandstone |
| 2208.15 | 0.2708 | 0.3090 | 0.3430 | 0 | 2 | Sandstone |
| 2208.40 | 0.2778 | 0.2462 | 0.4377 | 0 | 2 | Sandstone |
| 2208.65 | 0.2982 | 0.1727 | 0.5975 | 0 | 2 | Sandstone |
| 2208.90 | 0.2637 | 0.1880 | 0.7026 | 0 | 2 | Sandstone |
| 2209.15 | 0.3078 | 0.1672 | 0.7589 | 0 | 2 | Sandstone |
| 2209.40 | 0.3535 | 0.1693 | 0.7917 | 0 | 2 | Sandstone |
| 2209.65 | 0.3527 | 0.1584 | 0.7629 | 1 | 1 | Shale |
| 2209.90 | 0.3587 | 0.1884 | 0.7415 | 1 | 1 | Shale |
| 2210.15 | 0.3318 | 0.1737 | 0.7621 | 1 | 1 | Shale |
| 2210.40 | 0.3347 | 0.1537 | 0.8116 | 1 | 1 | Shale |
| 2210.65 | 0.3840 | 0.1543 | 0.8581 | 1 | 1 | Shale |
| 2210.90 | 0.3587 | 0.1788 | 0.8609 | 1 | 1 | Shale |
| 2211.15 | 0.3152 | 0.1702 | 0.8349 | 1 | 1 | Shale |
| 2211.40 | 0.2927 | 0.1426 | 0.8242 | 1 | 1 | Shale |
| 2211.65 | 0.2858 | 0.1392 | 0.8254 | 0 | 3 | Limestone |
| 2211.90 | 0.2907 | 0.1328 | 0.8296 | 0 | 3 | Limestone |
| 2212.15 | 0.2938 | 0.1154 | 0.8578 | 0 | 3 | Limestone |
| 2212.40 | 0.3983 | 0.1148 | 0.9171 | 0 | 3 | Limestone |
| 2212.65 | 0.3610 | 0.1506 | 0.9577 | 0 | 3 | Limestone |
| 2212.90 | 0.4050 | 0.1714 | 0.9570 | 0 | 3 | Limestone |
| 2213.15 | 0.3193 | 0.2010 | 0.9404 | 0 | 3 | Limestone |
| 2213.40 | 0.4492 | 0.2044 | 0.9322 | 0 | 3 | Limestone |
| 2213.65 | 0.4380 | 0.2142 | 0.9319 | 1 | 1 | Shale |
| 2213.90 | 0.3820 | 0.2550 | 0.9202 | 1 | 1 | Shale |
| 2214.15 | 0.3380 | 0.2393 | 0.9168 | 1 | 1 | Shale |
| 2214.40 | 0.3257 | 0.2085 | 0.9601 | 1 | 1 | Shale |
| 2214.65 | 0.3585 | 0.1401 | 1.0000 | 1 | 1 | Shale |
| 2214.90 | 0.3967 | 0.1348 | 0.9549 | 1 | 1 | Shale |
| 2215.15 | 0.3442 | 0.1572 | 0.8670 | 1 | 1 | Shale |

*FIG. 6B*

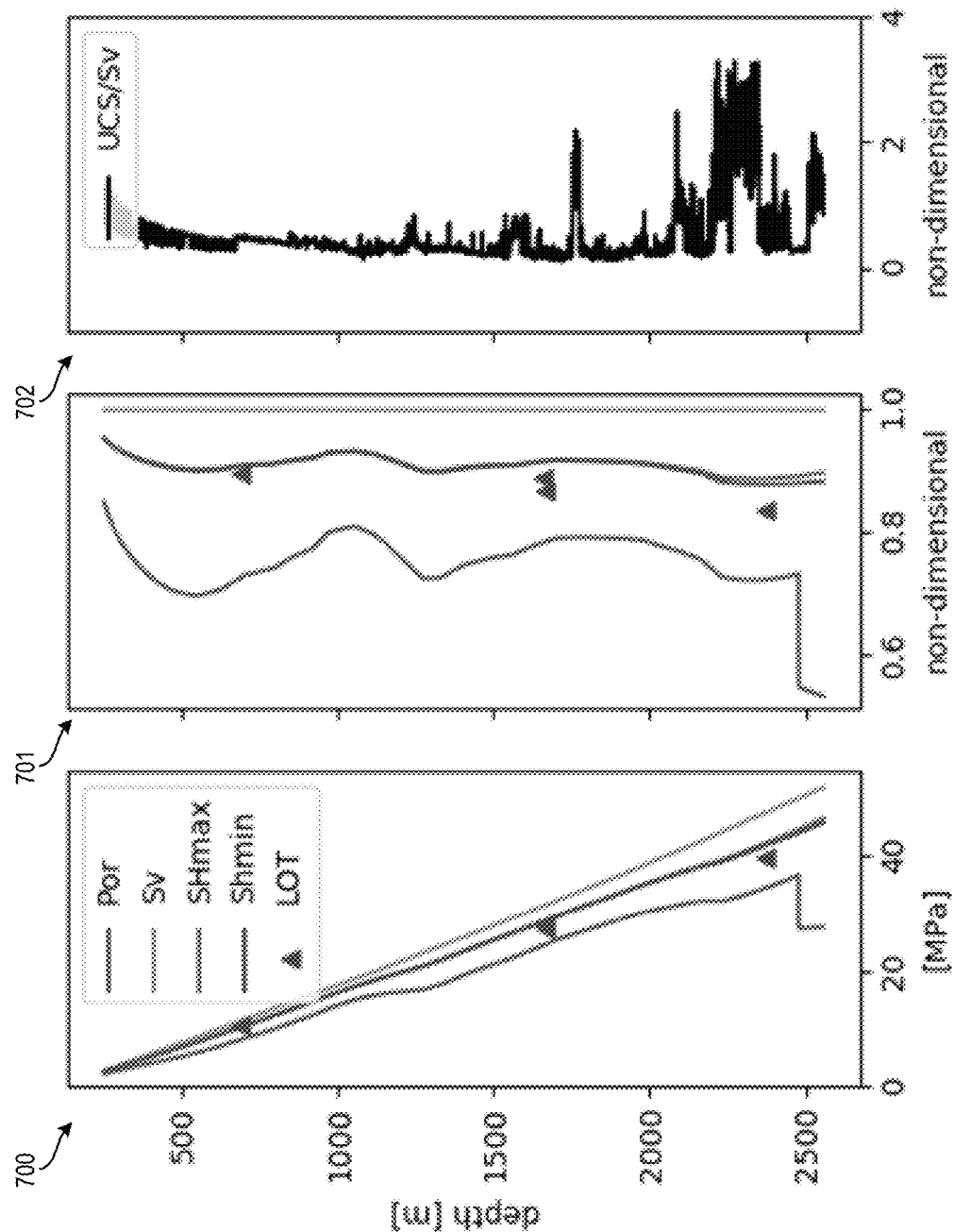

| X1 | X2 | X3 | X4 | Y |
|---|---|---|---|---|
| 0.90905291 | 0.91083569 | 0.72937398 | 0.5051274 | 0.89495279 |
| 0.91648417 | 0.91788498 | 0.7862062 | 0.24086577 | 0.88768845 |
| 0.91675142 | 0.91814748 | 0.78707289 | 0.24950664 | 0.86670815 |
| 0.87968426 | 0.88895689 | 0.72582021 | 0.45548865 | 0.83330015 |

*FIG. 8*

| Gamma [gAPI] | Density [g/cm3] | Resistivity [Ohm m] | Lithology |
|---|---|---|---|
| 74.0164 | 2.4275 | 1.1366 | Sandstone |
| 77.5678 | 2.417 | 1.0733 | Sandstone |
| 61.7979 | 2.4625 | 1.1087 | Sandstone |
| 49.2306 | 2.4667 | 1.4147 | Sandstone |
| 34.5303 | 2.4789 | 1.9311 | Sandstone |
| 37.6087 | 2.4582 | 2.2709 | Sandstone |
| 33.4406 | 2.4847 | 2.4528 | Sandstone |
| 33.8688 | 2.5121 | 2.5587 | Sandstone |
| 31.6868 | 2.5116 | 2.4658 | Shale |
| 37.6704 | 2.5152 | 2.3966 | Shale |
| 34.7358 | 2.4991 | 2.4631 | Shale |
| 30.7475 | 2.5008 | 2.6233 | Shale |
| 30.8647 | 2.5304 | 2.7736 | Shale |
| 35.7699 | 2.5152 | 2.7825 | Shale |
| 34.0483 | 2.4891 | 2.6985 | Shale |
| 28.5106 | 2.4756 | 2.664 | Shale |
| 27.8305 | 2.4715 | 2.6679 | Limestone |
| 26.5578 | 2.4744 | 2.6812 | Limestone |
| 23.0839 | 2.4763 | 2.7724 | Limestone |
| 22.9624 | 2.539 | 2.964 | Limestone |
| 30.115 | 2.5166 | 3.0955 | Limestone |
| 34.2877 | 2.543 | 3.0931 | Limestone |
| 40.1936 | 2.4916 | 3.0396 | Limestone |
| 40.8869 | 2.5695 | 3.0131 | Limestone |
| 42.8484 | 2.5628 | 3.012 | Shale |
| 50.9964 | 2.5292 | 2.9741 | Shale |
| 47.8558 | 2.5028 | 2.9632 | Shale |
| 41.6982 | 2.4954 | 3.1032 | Shale |
| 28.0292 | 2.5151 | 3.2321 | Shale |
| 26.9668 | 2.538 | 3.0864 | Shale |
| 31.4463 | 2.5065 | 2.8021 | Shale |

*FIG. 9A*

| x1 | x2 | x3 | y1 | y2 |
|---|---|---|---|---|
| 0.3701 | 0.2125 | 0.3517 | 0 | 2 |
| 0.3878 | 0.1950 | 0.3321 | 0 | 2 |
| 0.3090 | 0.2708 | 0.3430 | 0 | 2 |
| 0.2462 | 0.2778 | 0.4377 | 0 | 2 |
| 0.1727 | 0.2982 | 0.5975 | 0 | 2 |
| 0.1880 | 0.2637 | 0.7026 | 0 | 2 |
| 0.1672 | 0.3078 | 0.7589 | 0 | 2 |
| 0.1693 | 0.3535 | 0.7917 | 1 | 2 |
| 0.1584 | 0.3527 | 0.7629 | 1 | 1 |
| 0.1884 | 0.3587 | 0.7415 | 1 | 1 |
| 0.1737 | 0.3318 | 0.7621 | 1 | 1 |
| 0.1537 | 0.3347 | 0.8116 | 1 | 1 |
| 0.1543 | 0.3840 | 0.8581 | 1 | 1 |
| 0.1788 | 0.3587 | 0.8609 | 1 | 1 |
| 0.1702 | 0.3152 | 0.8349 | 1 | 1 |
| 0.1426 | 0.2927 | 0.8242 | 0 | 3 |
| 0.1392 | 0.2858 | 0.8254 | 0 | 3 |
| 0.1328 | 0.2907 | 0.8296 | 0 | 3 |
| 0.1154 | 0.2938 | 0.8578 | 0 | 3 |
| 0.1148 | 0.3983 | 0.9171 | 0 | 3 |
| 0.1506 | 0.3610 | 0.9577 | 0 | 3 |
| 0.1714 | 0.4050 | 0.9570 | 0 | 3 |
| 0.2010 | 0.3193 | 0.9404 | 0 | 3 |
| 0.2044 | 0.4492 | 0.9322 | 1 | 1 |
| 0.2142 | 0.4380 | 0.9319 | 1 | 1 |
| 0.2550 | 0.3820 | 0.9202 | 1 | 1 |
| 0.2393 | 0.3380 | 0.9168 | 1 | 1 |
| 0.2085 | 0.3257 | 0.9601 | 1 | 1 |
| 0.1401 | 0.3585 | 1.0000 | 1 | 1 |
| 0.1348 | 0.3967 | 0.9549 | 1 | 1 |
| 0.1572 | 0.3442 | 0.8670 | 1 | 1 |

*FIG. 9B*

PERFORMING AN ACTION AT A WELLBORE OPERATION BASED ON ANONYMIZED DATA

BACKGROUND

Embodiments described herein relate generally to downhole exploration and production efforts and more particularly to techniques for anonymizing data that can be used to perform an action at wellbore operation.

Downhole exploration and production efforts involve the deployment of a variety of sensors and tools. The sensors provide information about the downhole environment, for example, by providing measurements of temperature, density, and resistivity, among many other parameters. Other tools can be at the surface, for example, such as top drive or pumps. This information can be used to control aspects of drilling and tools or systems located in the bottomhole assembly, along the drillstring, or on the surface.

SUMMARY

According to one embodiment of the invention, a computer-implemented method for anonymizing data is provided. The method includes receiving, by a processing device, raw data from a wellbore operation. The raw data can be associated with depths. The method further includes anonymizing, by the processing device, the raw data to convert the raw data to anonymized data by shuffling the raw data and removing the association with the depths. The method further includes analyzing, by the processing device, the anonymized data. The method further includes performing an action at the wellbore operation based at least in part on the analysis of the anonymized data.

According to another embodiment of the present disclosure, a system is provided that includes a memory comprising computer readable instructions, and a processing device for executing the computer readable instructions for performing a method for anonymizing data. The method includes receiving, by the processing device, first raw data from a first wellbore operation, wherein the first raw data are associated with first depths. The method further includes receiving, by the processing device, second raw data from a second wellbore operation, wherein the second raw data are associated with second depths. The method further includes anonymizing, by the processing device, the first raw data to convert the first raw data to first anonymized data by shuffling the first raw data and removing the association with the first depths. The method further includes anonymizing, by the processing device, the second raw data to convert the second raw data to second anonymized data by shuffling the second raw data and removing the association with the second depths. The method further includes aggregating, by the processing device, the first anonymized data and the second anonymized data to generate aggregate anonymized data. The method further includes analyzing, by the processing device, the aggregate anonymized data. The method further includes performing an action at the first wellbore operation or the second wellbore operation based at least in part on the analysis of the aggregate anonymized data.

According to one embodiment of the invention, a computer-implemented method for anonymizing data is provided. The method includes receiving, by a processing device, raw data from a wellbore operation. The method further includes anonymizing, by the processing device, the raw data to convert the raw data to anonymized data by normalizing the raw data to ensure that a numeric range of the raw data are comparable. The method further includes analyzing, by the processing device, the anonymized data. The method further includes performing an action at the wellbore operation based at least in part on the analysis of the anonymized data.

According to one embodiment of the invention, a computer-implemented method for anonymizing data is provided. The method includes receiving, by a processing device, raw data from a wellbore operation. The method further includes anonymizing, by the processing device, the raw data to convert the raw data to anonymized data by non-dimensionalizing the raw data. The method further includes analyzing, by the processing device, the anonymized data. The method further includes performing an action at the wellbore operation based at least in part on the analysis of the anonymized data.

According to another embodiment of the present disclosure, a system is provided that includes a memory comprising computer readable instructions, and a processing device for executing the computer readable instructions for performing a method for anonymizing data. The method includes receiving, by a processing device, raw data from a wellbore operation, wherein the raw data are associated with depths. The method further includes anonymizing, by the processing device, the raw data to convert the raw data to anonymized data by normalizing the raw data to ensure that a numeric range of the raw data are comparable and by non-dimensionalizing the data to remove units from the raw data. The method further includes analyzing, by the processing device, the anonymized data. The method further includes performing an action at the wellbore operation based at least in part on the analysis of the anonymized data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

Referring now to the drawings wherein like elements are numbered alike in the several figures:

FIG. 5A depicts a table of raw data prior to performing anonymization using data shuffling;

FIG. 5B depicts a table of anonymized data generated by performing anonymization using data shuffling according to one or more embodiments of the present invention;

FIG. 6A depicts a table of raw data prior to performing anonymization using normalization according to one or more embodiments of the present invention;

FIG. 6B depicts a table of anonymized data generated by performing anonymization using normalization according to one or more embodiments of the present invention;

FIG. 7A depicts a graph of subsurface stress data, pore pressure data, and isolated leak-off tests (LOT) data with dimensional units;

FIG. 7B depicts a graph of the subsurface stress data, pore pressure data, and discrete LOT data that has been non-dimensionalized according to one or more embodiments of the present invention;

FIG. 7C depicts a graph of non-dimensionalized unconfined compressive strength data according to one or more embodiments of the present invention;

FIG. 8 depicts a table of non-dimensionalized data derived from the graph of FIG. 7B according to one or more embodiments of the present invention;

FIG. 9A depicts a table of raw data prior to performing anonymization using non-dimensionalization according to one or more embodiments of the present invention; and FIG. 9B depicts a table of anonymized data generated by performing anonymization using non-dimensionalization according to one or more embodiments of the present invention.

DETAILED DESCRIPTION

The present techniques relate to anonymizing data collected or received from wellbore operations so that the data can be analyzed without compromising certain confidential or proprietary information associated with the data. Anonymizing data is described herein as modified raw data in order to remove identifiable information (e.g., confidential and/or proprietary information) to generate anonymous data. The anonymous data can be used by third parties to perform analyses without compromising the confidential and/or proprietary information contained in the raw data. As described herein, anonymizing data can include shuffling the data, normalizing the data, and/or non-dimensionalizing the data. Anonymized data from one wellbore can be aggregated with anonymized data from other wellbores to generate models that can be used to perform various actions at any of the wellbores (e.g., completion actions, production actions, drilling actions, etc.)

The present techniques provide for anonymizing data with or without data models derived from these data locked with a key. The anonymization techniques are tailored to the analysis to be undertaken and the involved data types. The anonymization techniques described herein can utilize parallelized block chaining or stream cipher or other encryption techniques, and aggregate signature extraction schemes to efficiently encode data spatially, temporally, or in the frequency domain. The anonymized data models can take the form of simulations or other scheme-based data analytics methods such as clustering (to extract hidden topology from the raw data) or aggregate data models.

Data anonymization can be beneficial to a variety of different use cases. For example, an operator can share data that cannot be traced back to their organization (or their assets), and for which only they hold the key. This increases the willingness to share the data for aggregate analysis by a third party in order to receive the benefits of such an aggregate analysis (possibly with additional post-decryption results). As another example, standard data exchange can occur with service companies without risking accidental disclosure. As yet another example, internal data storage can be implemented where some employees have access to the raw data while others only have access to anonymized data. In yet another example, cloud-based data processing or numerical simulation can be performed, where input and output data are generic (e.g. dimensionless and range-scaled matrix and vectors for matrix computations) such that only the key holder can decode the anonymized data.

Figure 1:
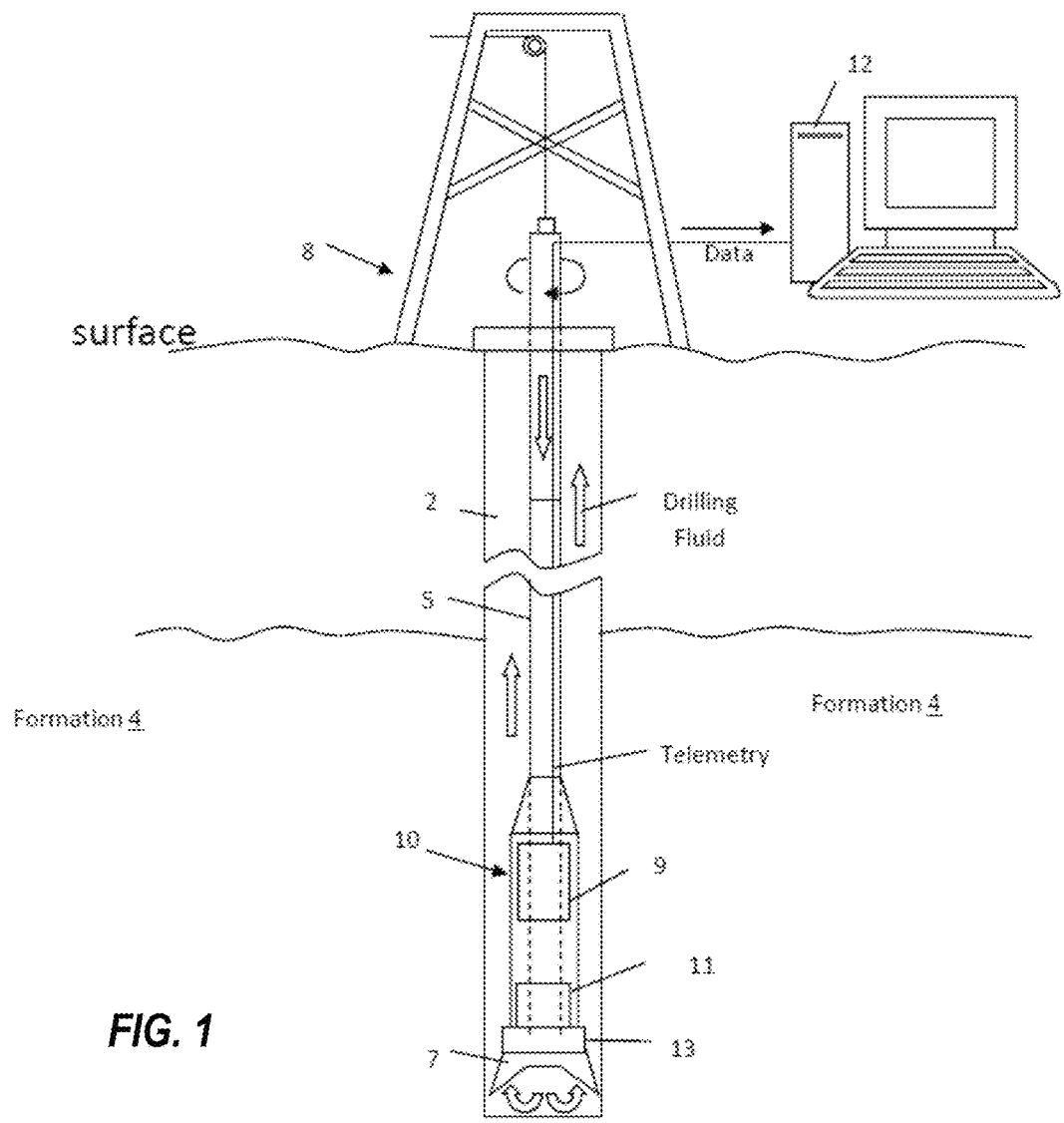
FIG. 1 depicts a cross-sectional view of a downhole system according to one or more embodiments of the present invention.

FIG. 1 depicts a cross-sectional view of a wellbore operation 100 according to an embodiment of the present disclosure. The system and arrangement shown in FIG. 1 is one example to illustrate the downhole environment. While the system can operate in any subsurface environment, FIG. 1 shows downhole tools 10 disposed in a borehole 2 penetrating a formation 4. The downhole tools 10 are disposed in the borehole 2 at a distal end of a carrier 5, as shown in FIG. 1, or in communication with the borehole 2 (not shown). The downhole tools 10 can include measurement tools 11 and downhole electronics 9 configured to perform one or more types of measurements in embodiments known as Logging-While-Drilling (LWD) or Measurement-While-Drilling (MWD).

According to the LWD/MWD embodiments, the carrier 5 is a drill string that includes a bottomhole assembly (BHA) 13. The BHA 13 is a part of the drilling rig 8 that includes drill collars, stabilizers, reamers, and the like, and the drill bit 7. The measurements can include measurements related to drill string operation, for example. A drilling rig 8 is configured to conduct drilling operations such as rotating the drill string and, thus, the drill bit 7. The drilling rig 8 also pumps drilling fluid through the drill string in order to lubricate the drill bit 7 and flush cuttings from the borehole 2.

Raw data and/or information processed by the downhole electronics 9 can be telemetered to the surface for additional processing or display by a processing system 12. Drilling control signals can be generated by the processing system 12 and conveyed downhole or can be generated within the downhole electronics 9 or by a combination of the two according to embodiments described herein. The downhole electronics 9 and the processing system 12 can each include one or more processors and one or more memory devices. In alternate embodiments, computing resources such as the downhole electronics 9, sensors, and other tools can be located along the carrier 5 rather than being located in the BHA 13, for example. The borehole 2 can be vertical as shown or can be in other orientations/arrangements.

Figure 2:
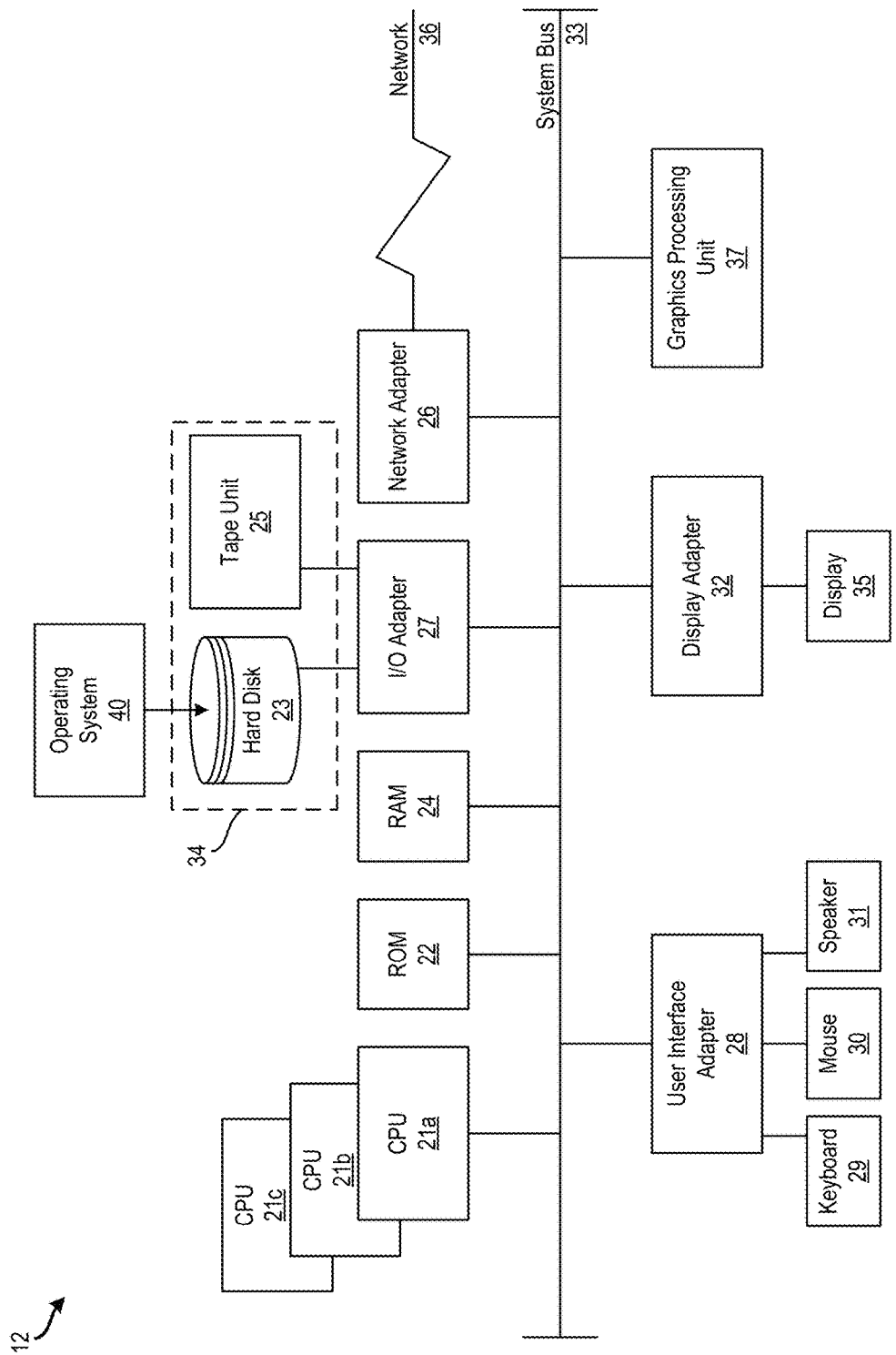
FIG. 2 depicts a block diagram of the processing system of FIG. 1, which can be used for implementing the techniques described according to one or more embodiments of the present invention.

It is understood that embodiments described herein are capable of being implemented in conjunction with any other suitable type of computing environment now known or later developed. For example, FIG. 2 depicts a block diagram of the processing system 12 of FIG. 1, which can be used for implementing the techniques described herein. In examples, processing system 12 has one or more central processing units (processors) 21a, 21b, 21c, etc. (collectively or generically referred to as processor(s) 21 and/or as processing device(s)). In some embodiments, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 12.

Further illustrated are an input/output (I/O) adapter 27 and a communications adapter 26 coupled to system bus 33. I/O adapter 27 can be a small computer system interface (SCSI)

adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 12 can be stored in mass storage 34. A network adapter 26 interconnects system bus 33 with an outside network 36 enabling processing system 12 to communicate with other such systems.

A display (e.g., a display monitor) 35 is connected to system bus 33 by display adaptor 32, which can include a graphics adapter to improve the performance of graphics intensive applications and a video controller. In one aspect of the present disclosure, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some embodiments, processing system 12 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 12 includes processing capability in the form of processors 21, storage capability including system memory (e.g., RAM 24), and mass storage 34, input means such as keyboard 29 and mouse 30, and output capability including speaker 31 and display 35. A portion of system memory (e.g., RAM 24) and mass storage 34 collectively store an operating system to coordinate the functions of the various components shown in processing system 12.

Figure 3A:
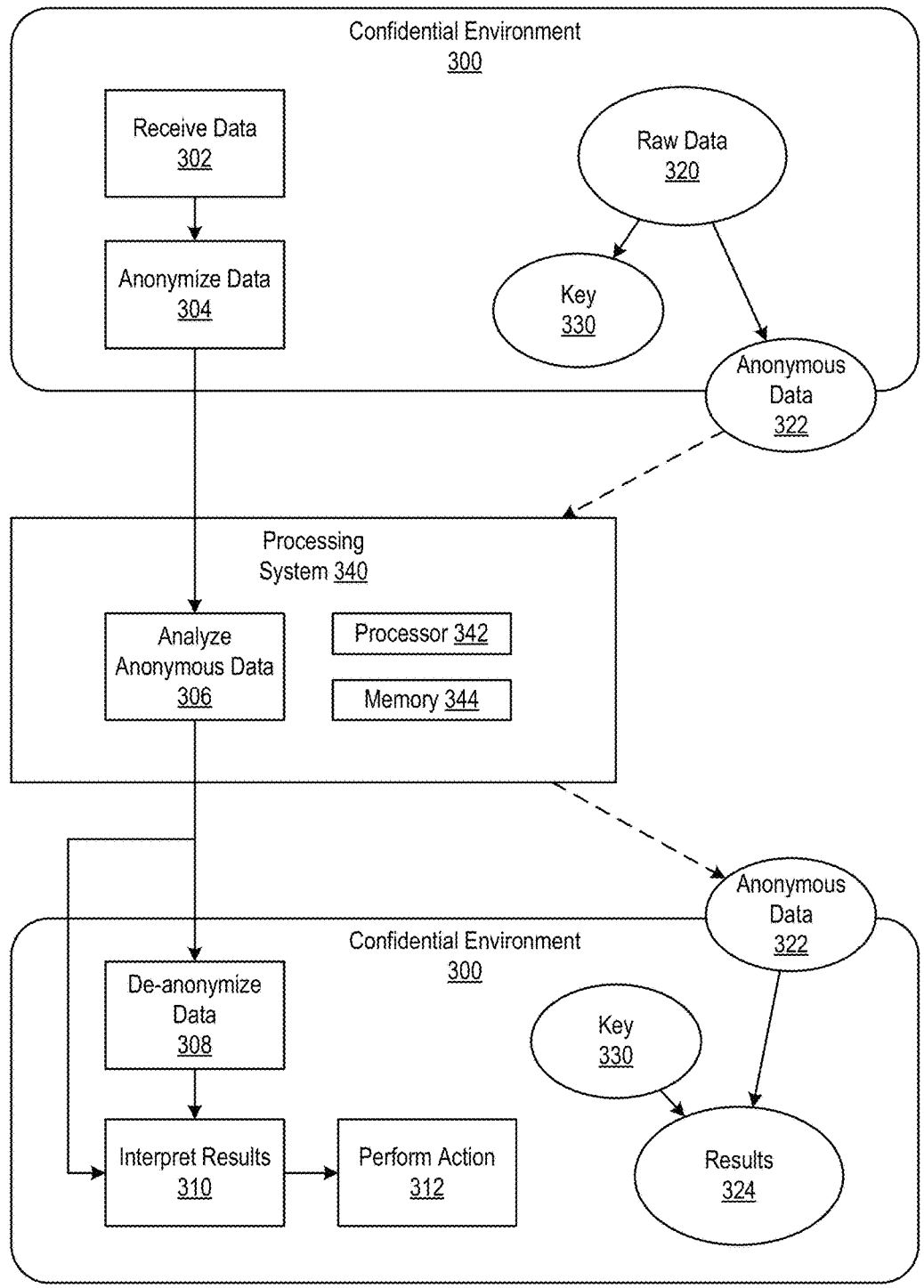
FIG. 3A depicts a workflow that implements a confidential environment to anonymize data for processing by a processing system according to one or more embodiments of the present invention.
Figure 3B:
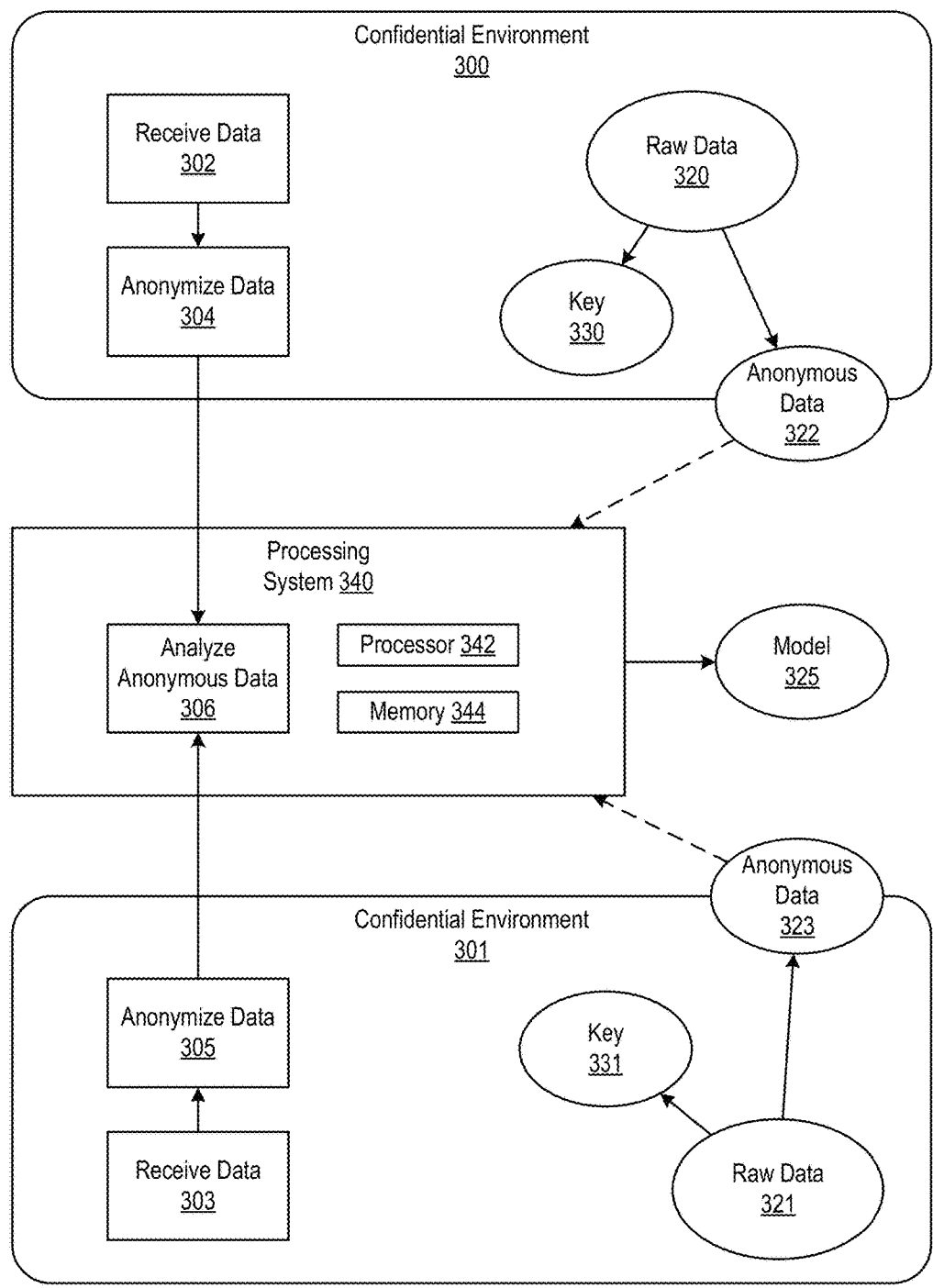
FIG. 3B depicts a workflow that implements two confidential environments to anonymize data for processing by a processing system according to one or more embodiments of the present invention.

FIG. 3B depicts a workflow that implements a confidential environment 300 to anonymize data for processing by a processing system 340 according to one or more embodiments of the present invention. The workflow of FIG. 3A can be implemented, in whole or in part, using a suitable processing device and/or processing system, such as the processing system 12 of FIGS. 1 and 2.

Anonymizing data (also referred to herein as "encrypting" data) is the process by which data are transformed through shuffling, normalization, and/or non-dimensionalization techniques to remove identifying features of the data while retaining useful information. Generally, raw data 320 is anonymized in the confidential environment and sent to a non-confidential environment for analysis (e.g., the processing system 340). The analysis can be used to perform an action(s) at a wellbore operation, such as drilling actions, completion actions, production actions, etc. FIG. 3A is now described in more detail with reference to an aggregate shale discrimination analysis based on log data. However, it should be appreciated that such the present techniques can be applied to different types of data and such example is not intended to be limiting.

The steps 302, 304, 306, 308, 310, 312 represent actions of the workflow and the ellipsoidal components depict the state of data and information. The confidential environment 300 represents an environment in which data are maintained confidentially and are made not publically available. Examples include corporate networks, computers, disk/memory devices, etc., that can hold electronic information (i.e., data). In some examples, the confidential environment 300 can be the same environment or can be different environments. Some of the steps of the workflow depicted in FIG. 3A are performed within the confidential environment 300, while other steps of the workflow are performed outside the confidential environment 300, such as by the processing system 340. Data used during the steps of the workflow performed outside the confidential environment 300 are potentially publically visible. The steps of the workflow are now described.

At step 302, data are received or obtained. In some examples, this includes measuring and recording log data, such as during LWD or MWD. Receiving or obtaining the data can also include performing a numerical simulation to simulate data. More generally, any technique of obtaining or collecting data can be implemented.

At step 304, the data received/obtained at step 302 (e.g., the raw data 320) is anonymized. During the step 304, the raw data 320 is modified in order to remove identifiable information to generate anonymous data 322. Anonymizing the data can include one or more tasks to remove the identifiable information while preserving the data in a useful form for analysis. For example, header information (e.g., metadata) can be stripped, raw stress data can be converted to equivalent gradients, the data can be non-dimensionalized, the data can be normalized, and the data can be shuffled. These tasks are further described herein with reference to FIG. 4.

In some embodiments, a key 330 is generated when the raw data 320 is anonymized as anonymous data 322. The key 330 enables the anonymous data 322 to be de-anonymized (or decoded). The key can be a single-entity key (i.e., representable by a string or number) or a number of sub-keys (e.g., one per task, etc.). The key 330 can be securely transferred between and among confidential environments so that different confidential environments can de-anonymize the anonymous data 322 to determine results 324 of an analysis, for example.

At step 306, the anonymous data are analyzed by the processing system 340. The anonymous data 322 is received from the confidential environment 300 and is used to perform an analysis or to create or improve a model based on aggregated data received from multiple confidential environments. For example, wellbores can be owned by different entities. Data can be collected at each wellbore and anonymized within confidential environments of the different entities. The anonymized data can be sent by the different entities to the processing system 340 so that the processing system 340 can aggregate the anonymous data from the different entities to perform an analysis or modeling technique. The differentiation between confidential and non-confidential (or "open") environments is useful, for example, when data owners want to provide a service entity with data for analysis, but do not want to reveal confidential information. It is also useful to aggregate data by different operations into a public model where a service entity can collect anonymized data to create a public model to which different data owners (e.g., operators of wellbores) have access. In this case, the data owners benefit from the models created with aggregated data from various sites but each data owner only has access to its own raw data.

The analyze anonymous data step 306 can include various analyses, such as classification operations, principal component analyses, or cluster analyses. Anonymized data can come in the form of feature arrays (X) and target arrays (y). Both feature arrays and target arrays may contain numeric values, oftentimes in the range [−1, 1] or [0, 1]. Aggregate information from several data owners is not to be traceable to a specific hydrocarbon asset or wellbore. At this step, a model can be created by training a machine learning method on this data (i.e., (X,y)→model). The model is sent to the confidential environment 300 as results 324.

In some embodiments, the anonymous data 322 is passed back to the confidential environment 300 (or to another confidential environment). The anonymous data 322 can be de-anonymized (i.e., decoded) by using the aggregate model (i.e., the results 324) created at the analysis step 306 to retrieve predictions based no data that has not been seen by the machine learning method beforehand (X'), which can be used to obtain answers (y'): (X', model)→y'. The key 330 can be used to de-anonymize, or decode, the anonymous data 322 back to meaningful quantities to the data owner. For example, numeric values y' can be translated from a list of integers [0, 1, 2, . . . ] to rock type definitions (e.g., "shale," "sandstone," "sand," etc.).

At step 310, the results 324 can be interpreted (with or without deanonymizing the data) and evaluated. For example, historical experience and common sense can be applied, with an understanding of the original raw data, to determine whether the results 324 make sense and how the results 324 can apply to a particular wellbore operation.

At step 312, an action is performed at the wellbore operation based on the results 324. That is, the results 324 are utilized to perform an action. For the shale discrimination example, such an action might include performing a wellbore stability analysis or a pore pressure prediction and subsequent drilling, completion, or production actions. For the fracture initiation example, such an action might be performing a hydraulic fracturing operation. In the case of a drilling action, the drilling action can include causing the drill bit 7 to drill into the formation 4. The drilling action can specify parameters such as a weight-on-bit, a rate-of-penetration, or other parameters to control the drill bit. These parameters can be determined as part of the analysis of the anonymous data at step 306.

FIG. 3B depicts a workflow that implements two confidential environments 300, 301 to anonymize data for processing by a processing system 340 according to one or more embodiments of the present invention. The workflow of FIG. 3B can be implemented, in whole or in part, using a suitable processing device and/or processing system, such as the processing system 12 of FIGS. 1 and 2.

In the example of FIG. 3B, the confidential environment 300 receives or obtains data (i.e., the raw data 320) at step 302 and anonymizes the data as anonymous data 322 at step 304. A key 330 can also be produced so the anonymous data 322 can later be decoded by the confidential environment 300. Similarly, the confidential environment 301 receives or obtains data (i.e., the raw data 321) at step 303 and anonymizes the data as anonymous data 323 at step 305. A key 331 can also be produced so the anonymous data 322 can later be decoded by the confidential environment 330.

The processing system 340 receives the anonymous data 321, 323 from each of the confidential environments 300, 301. The processing system 340 can aggregate the anonymous data 321, 323 and produce a model 325, such as by applying machine learning techniques on the aggregated data. The model 325 can be used by third parties to infer rock-types, for example, without having access to the raw data 320, 321. Therefore, the anonymous data 322, 323 remains anonymous to those outside the respective confidential environments 300, 301 but can still be useful.

The various components, modules, engines, etc. described regarding FIG. 3A and FIG. 3B can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processing device (e.g., the processor 342, the processor 21) for executing those instructions. Thus a system memory (e.g., memory 344, the RAM 24) can store program instructions that when executed by the processing device implement the engines described herein. Other engines can also be utilized to include other features and functionality described in other examples herein.

Figure 4:
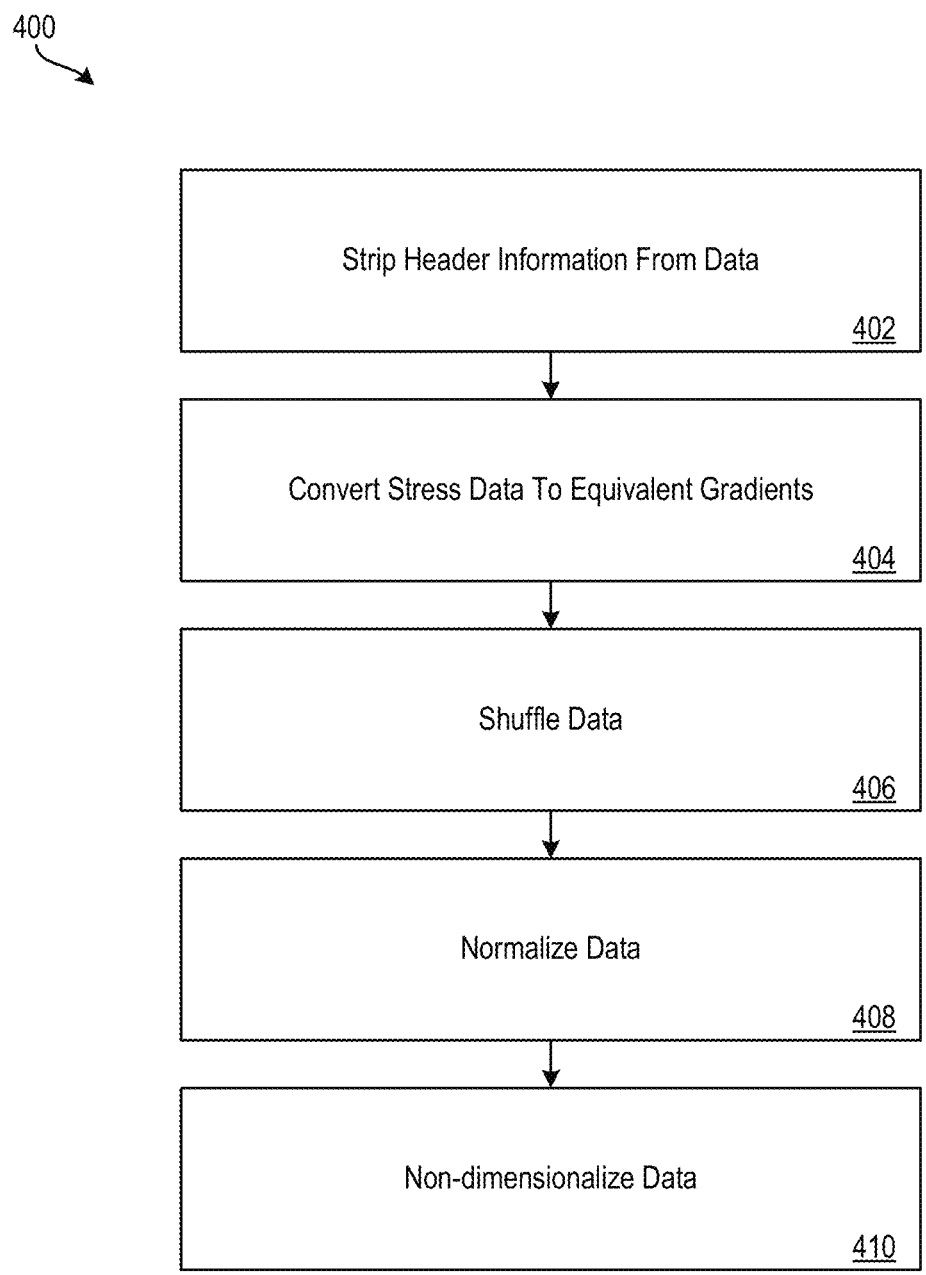
FIG. 4 depicts a method of anonymizing data according to one or more embodiments of the present invention.

FIG. 4 depicts a method 400 of anonymizing data according to one or more embodiments of the present invention. The method 400 of FIG. 4 can be implemented, in whole or in part, using a suitable processing device and/or processing system, such as the processing system 12 of FIGS. 1 and 2. It should be appreciated that the method 400 is performed in a confidential environment, such as the confidential environment 300, to preserve the confidentiality of the raw data.

At block 402, header information is stripped from the raw data. The header information can include the particular wellbore from which the data were obtained, the operator who obtained the data, location information of the wellbore, operating conditions at the wellbore, and other similar metadata that might be identifying. Stripping such information does not change the nature of the data and merely preserves the confidentiality of the raw data.

At block 404, stress data are converted to equivalent gradients. To perform such a conversion, each value of stress data is divided by its corresponding depth. This converts the stress data to gradients that consider the corresponding depth without disclosing the depth to third-parties. By converting the stress data to equivalent gradients, the specific depth information is effectively removed, thus preserving the confidentiality of the raw data.

At block 406 the data are shuffled. Data shuffling can be useful for facies discrimination. Facies discrimination involves identifying the rock type in a formation from different data logs (i.e., raw data). Physical rock characteristics manifest themselves in certain consistent relations, which enable experts to perform this operation with relatively consistent success. In these operations, experts look at cross plots (i.e., scatter plots of different parameters against each other), whereby the depth information may be lost.

If the analysis performed by the processing system 340 at step 306 of FIG. 3A or FIG. 3B is a machine learning technique on log data, the relationship between different rock parameters can be trained and subsequently be used to infer rock types from previously unseen data. In the context of shale identification, data sets can include gamma ray data, resistivity data, density data, shear slowness data, and compressional slowness data.

An example of raw data for data shuffling is depicted in the table 500 of FIG. 5A. The data are arranged in a table format where columns represent the different log data sets (e.g., depth, gamma ray, density, resistivity, lithology, etc.), and rows represent measurements associated with a specific depth. In this example, data shuffling refers to shuffling rows of the table 500. The shuffled data (i.e., anonymized data) are depicted in the table 501 of FIG. 5B. In this case, rows are shuffled and the depth data are removed. For the subsequent analysis, depth information is ignored. Therefore, removing the depth data does not limit the analysis or the application of the results of the analysis.

The lithology information can be encoded as a sequence of 0 or 1 values for binary classification, where 0 means "no shale" and 1 means "shale." It should be appreciated that other lithology types can be distinguished using this same technique. Further, a series of integers can be used for multi-class classification. For example, 1 can indicate shale, 2 can indicate limestone, 3 can indicate sandstone, and so forth.

The anonymized data can be utilized in machine learning techniques such as classification with logistic regression or support vector machines or neural networks. In such cases, it may be useful to apply the key 330 to relate the anonymized data back to the raw data or its source in a confidential environment. For example, cloud computing environments can be implemented in which the anonymized data table (i.e., the table 501) is transferred to a non-confidential environment and analyzed and the results are returned to the confidential environment without risk of the raw data being viewed. A third party (i.e., someone without the key 330) gaining access to the data would have no way of knowing whether the anonymized data or the results are related to facies discrimination or something else entirely (e.g., market segmentation analysis of mobile phone users). The key 330, in the case of data shuffling to anonymize the data, could be a reverse of the shuffling of the rows such that the rows of the table 501 are re-ordered to match the pre-shuffled data depicted in the table 500.

With continued reference to FIG. 4, at block 408, the data are normalized. This can be used for facies discrimination for example. As described herein, facies discrimination involves identifying the rock type in a formation from different data logs (i.e., raw data). Physical rock characteristics manifest themselves in certain consistent relations, which enable experts to perform this operation with relatively consistent success. In these operations, experts look at cross plots (i.e., scatter plots of different parameters against each other), whereby the depth information may be lost.

If the analysis performed by the processing system 340 at step 306 of FIG. 3A or FIG. 3B is a machine learning technique on log data, the relationship between different rock parameters can be trained and subsequently be used to infer rock types from previously unseen data. In the context of shale identification, data sets can include gamma ray data, resistivity data, density data, shear slowness data, and compressional slowness data.

Normalization of the raw data ensures that the numeric range of the data (which can be used, for example, in the machine learning technique) are comparable. Normalization can also aid in avoiding bias or weighting of features whose units lead to large numeric values. For instance, there is no physical reason why a density of 2500 kg/m$^3$ would have a significantly higher impact on results than a density of 2.5 g/cm$^3$. Besides aiding the machine learning technique, normalization also provides for anonymity of raw data (e.g., the raw data 320) by splitting information into anonymized data (e.g., the anonymized data 322) and a key (e.g., the key 330).

In the context of data anonymization using normalization, the raw data can include depth data, density data, gamma ray data, resistivity data, and lithology data, which can be represented a multi-column table. For example, FIG. 6A depicts a table 600 of raw data for data normalization. The data is normalized by converting the data values to values between 0 and 1, for example, although other scales (e.g., −1 to 1, etc.) can be used. As depicted in the table 601 of FIG. 6B, the raw data is normalized by converting the density data, gamma ray data, and resistive data into values between 0 and 1. The lithology associated with each depth is presented in three different ways: as binary (e.g., 0=no shale, 1=shale), multi-class (e.g., 1=shale, 2=sandstone, 3=limestone), and textually (e.g., "Sandstone," "Shale," "Limestone").

A key (e.g., the key 330) can be generated during the data anonymization so that the anonymized data can be decrypted (or de-anonymized) in the confidential environment. In particular, the key tracks the name and normalization range for the various columns of the data that are normalized. The key also includes a map of integers to rock types. In an example, the key can be expressed as follows: [('GR', 0, 200), ('rho', 2.3, 2.9), ('res', 10, 1000.), ('shale', 'limestone', 'sandstone', 'basalt', 'siltstone')]. Taking the first element [('GR', 0, 200)] as an example, the key indicates that the gamma ray ('GR') is normalized on a range from 0 to 200. That is, each gamma ray in the table 600 is divided by 200 to generate the normalized gamma ray value in the table 601.

The anonymized data generated using normalization can be utilized in machine learning techniques such as classification with logistic regression or support vector machines. However, without the key, the results are not useful. In other words, without the key, the anonymous data cannot be used to relate back to the original (raw) data or its source. This is particularly beneficial where data from multiple wellbore operations is to be aggregated and analyzed, such as to generate models. In this way, the models can be generated without compromising the raw data, and the owner of one wellbore operation cannot access raw data from the owner of another wellbore operation without the other wellbore operation's key. Moreover, as described previously, a third party (i.e., someone without the key 330) gaining access to the data would have no way of knowing whether the anonymized data or the results are related to facies discrimination or something else entirely With continued reference to FIG. 4, at block 410, dimensions are removed from the data to non-dimensionalize the data. By non-dimensionalizing the data, the data is anonymized and can be used, e.g., for predicting fracture pressure initiation.

Fracture initiation prediction involves analysis of in-situ stresses, pore pressures, and treating pressures. Generally, treatment pressures should at minimum overcome the minimum principal stress plus whatever tensile/shear strength the material exhibits. Near-borehole stresses complicate the analysis somewhat, although a theoretical understanding has been developed previously. However, the prediction of fracture initiation pressures and leak-off tests, which essentially are isolated measurements in certain formations, do not always agree. The prediction of fracture initiation pressures for a certain wellbore would benefit from a comparison with a database of previous simulations (e.g., a model), where fracture initiation was measured. In such an example, keeping data both anonymous and useful can be accomplished by non-dimensionalizing the data.

Since in-situ stresses increase with depth, any analysis of dimensional numbers (e.g., in MPa) is depth-dependent. However, it is possible to normalize stresses and pressures by dividing the stresses and pressures by the vertical/litho-static stress value. Doing so eliminates, to a very large degree, the depth-dependency. The resulting data is non-dimensional (i.e., unit of MPa/MPa=1).

FIG. 7A depicts a graph 700 of subsurface stress data, pore pressure data, and discrete leak-off tests (LOT) data with dimensional units while FIG. 7B depicts a graph 701 of the subsurface stress data, pore pressure data, and isolate LOT data that has been non-dimensionalized according to one or more embodiments of the present invention. FIG. 7C depicts a graph 702 of non-dimensionalized unconfined compressive strength data according to one or more embodiments of the present invention.

The graph 700 includes plots of pore pressure (Por), vertical stress (Sv), maximum horizontal stress (SHmax), minimum horizontal stress (Shmin), and LOT. To normalize the data from the graph 700, the data are divided by the vertical/litho-static stress (i.e, the vertical stress (Sv) to eliminate depth-dependency. The graph 701 depicts the resulting non-dimensionalized data (Por, Sv, SHmax, Shmin, LOT). The graph 702 depicts unconfined compressive stress (UCS) data non-dimensionalized by diving the UCS data by the vertical stress (Sv) data.

After non-dimensionalizing the data, simulation results or leak-off tests at different depths can be compared with each other and with subsurface data in a table (such as the table 800 of FIG. 8) that does not include depth information. In particular, FIG. 8 depicts a table 800 that includes anony-mized, non-dimensional subsurface data derived from the graph 701 of FIG. 7B. In the example of FIG. 8, the non-dimensional data does not include depth information. The columns X1, X2, X3, and X4 relate respectively to the Shmin, SHmax, Por, and USC data of graphs 701, 702. In particular, the Shmin data are divided by the vertical stress (Sv) data, the SHmax data are divided by the Sv data, the Por data are divided by the Sv data, and the USC data are divided by the Sv data. The column Y relates to the LOT data divided by the Sv data. By dividing the respective data by the Sv data, the units from the data are removed and the data are non-dimensionalized (and therefore, anonymized).

Tables, such as the table 800, can be merged for different wellbores to build an aggregate data table for which it is impossible to track the data back to a specific source. Thus, different wellbore operators can combine their data to gain the benefit of a larger dataset without revealing precise information about their respective wells. One application where such aggregate data can be utilized is a predictive machine learning technique that can be used to predict tensile strength before drilling or stimulation commences. This technique may be a regression technique as opposed to a classification technique as previously described.

FIG. 9A depicts a table 900 of raw data prior to perform-ing anonymization using non-dimensionalization according to one or more embodiments of the present invention. As shown, the table 900 includes gamma ray data, density data, resistive data, and lithology classification data. It should be appreciated that the various data of the table 900 include units (e.g., gamma ray data are in the unit gAPI, density data are in the unit g/cm$^3$, and resistivity data are in the unit Ohm m). To non-dimensionalize the data, the data are divided by normalized values having the same units as the respective data (e.g., gamma ray data are divided by normalized values with a unit gAPI). This effectively removes the units (i.e., non-dimensionalizes) from the data.

The results of the non-dimensionalization are shown in FIG. 9B. In particular, FIG. 9B depicts a table 901 of anonymized data generated by performing anonymization using non-dimensionalization according to one or more embodiments of the present invention. In the table 901, the gamma ray ('x1'), density ('x2'), and resistivity data ('x3') are all non-dimensionalized (i.e., without units). The lithol-ogy information can be encoded as a sequence of 0 or 1 values for binary classification ('y1'), where 0 means "no shale" and 1 means "shale." It should be appreciated that other lithology types can be distinguished using this same technique. Further, a series of integers can be used for multi-class classification ('y'). For example, 1 can indicate shale, 2 can indicate limestone, 3 can indicate sandstone, and so forth.

Additional processes also can be included in the method 400, and it should be understood that the processes depicted in FIG. 4 represent illustrations, and that other processes can be added or existing processes can be removed, modified, or rearranged without departing from the scope and spirit of the present disclosure. For example, the blocks 402, 404, 406, 408, 410 can be performed in different orders than depicted in FIG. 4, and the order shown is merely one such example and is not intended to be limiting. The actual steps taken to anonymize data depends on the analysis to be undertaken, which can also dictate the time of data used.

Set forth below are some embodiments of the foregoing disclosure:

Embodiment 1

A computer-implemented method for anonymizing data, the method comprising: receiving, by a processing device, raw data from a wellbore operation, wherein the raw data are associated with depths; anonymizing, by the processing device, the raw data to convert the raw data to anonymized data by shuffling the raw data and removing the association with the depths; analyzing, by the processing device, the anonymized data; and performing an action at the wellbore operation based at least in part on the analysis of the anonymized data.

Embodiment 2

The computer-implemented method of any prior embodi-ment, wherein the analyzing comprises performing a lithol-ogy classification for the wellbore operation based at least in part on the anonymized data.

Embodiment 3

The computer-implemented method of any prior embodi-ment, wherein the lithology classification is a binary lithol-ogy classification.

Embodiment 4

The computer-implemented method of any prior embodi-ment, wherein the lithology classification is a multi-class lithology classification.

Embodiment 5

The computer-implemented method of any prior embodi-ment, wherein the raw data comprise gamma ray data, density data, and resistivity data.

Embodiment 6

The computer-implemented method of any prior embodiment, wherein anonymizing the raw data further comprises removing header information from the raw data.

Embodiment 7

The computer-implemented method of any prior embodiment, wherein the raw data comprises stress data, and wherein anonymizing the raw data further comprises converting the stress data to equivalent gradients.

Embodiment 8

The computer-implemented method of any prior embodiment, further comprising: deanonymizing, by the processing device, the anonymous data to generate results data.

Embodiment 9

The computer-implemented method of any prior embodiment, wherein deanonymizing the anonymous data to generate the result data comprises applying a key to the anonymous data to generate the results data.

Embodiment 10

The computer-implemented method of any prior embodiment, wherein performing the action at the wellbore operation comprises performing at least one of a drilling action, a completion action, and a production action.

Embodiment 11

The computer-implemented method of any prior embodiment, wherein anonymizing the raw data is performed in a confidential environment.

Embodiment 12

A system comprising: a memory comprising computer readable instructions and a processing device for executing the computer readable instructions for performing a method for anonymizing data, the method comprising: receiving, by the processing device, first raw data from a first wellbore operation, wherein the first raw data are associated with first depths; receiving, by the processing device, second raw data from a second wellbore operation, wherein the second raw data are associated with second depths; anonymizing, by the processing device, the first raw data to convert the first raw data to first anonymized data by shuffling the first raw data and removing the association with the first depths; anonymizing, by the processing device, the second raw data to convert the second raw data to second anonymized data by shuffling the second raw data and removing the association with the second depths; aggregating, by the processing device, the first anonymized data and the second anonymized data to generate aggregate anonymized data; analyzing, by the processing device, the aggregate anonymized data; and performing an action at the first wellbore operation or the second wellbore operation based at least in part on the analysis of the aggregate anonymized data.

Embodiment 13

The system of any prior embodiment, the method further comprising: deanonymizing, by the processing device, the first anonymous data from the aggregate anonymized data to generate first results data by applying a first key to the anonymous data to generate the first results data, wherein the second anonymous data remains anonymous.

Embodiment 14

The system of any prior embodiment, the method further comprising: deanonymizing, by the processing device, the second anonymous data from the aggregate anonymized data to generate second results data by applying a second key to the anonymous data to generate the second results data, wherein the first anonymous data remains anonymous.

Embodiment 15

The system of any prior embodiment, wherein anonymizing the first raw data is performed in a first confidential environment, and wherein anonymizing the second raw data is performed in a second confidential environment.

Embodiment 16

A computer-implemented method for anonymizing data, the method comprising: receiving, by a processing device, raw data from a wellbore operation; anonymizing, by the processing device, the raw data to convert the raw data to anonymized data by normalizing the raw data to ensure that a numeric range of the raw data are comparable; analyzing, by the processing device, the anonymized data; and performing an action at the wellbore operation based at least in part on the analysis of the anonymized data.

Embodiment 17

The computer-implemented method of any prior embodiment, wherein the numeric range of the anonymized data is [0, 1].

Embodiment 18

The computer-implemented method of any prior embodiment, wherein the numeric range of the anonymized data is [−1, 1].

Embodiment 19

The computer-implemented method of any prior embodiment, further comprising: generating, by the processing device, a key during the anonymizing, the key being configured to enable the anonymized data to be deanonymized.

Embodiment 20

The computer-implemented method of any prior embodiment, further comprising: deanonymizing, by the processing device, the anonymous data to generate results data by applying the key to the anonymous data to generate the results data.

Embodiment 21

The computer-implemented method of any prior embodiment, wherein the analyzing comprises performing a lithology classification for the wellbore operation based at least in part on the anonymized data.

Embodiment 22

The computer-implemented method of any prior embodiment, wherein anonymizing the raw data is performed in a confidential environment.

Embodiment 23

A computer-implemented method for anonymizing data, the method comprising: receiving, by a processing device, raw data from a wellbore operation; anonymizing, by the processing device, the raw data to convert the raw data to anonymized data by non-dimensionalizing the raw data; analyzing, by the processing device, the anonymized data; and performing an action at the wellbore operation based at least in part on the analysis of the anonymized data.

Embodiment 24

The computer-implemented method of any prior embodiment, wherein raw data comprise pore pressure data, and wherein anonymizing the data by non-dimensionalizing the data comprises dividing the pore pressure data by vertical stress data.

Embodiment 25

The computer-implemented method of any prior embodiment, wherein raw data comprise maximum horizontal stress data, and wherein anonymizing the data by non-dimensionalizing the data comprises dividing the maximum horizontal stress data by vertical stress data.

Embodiment 26

The computer-implemented method of any prior embodiment, wherein raw data comprise minimum horizontal stress data, and wherein anonymizing the data by non-dimensionalizing the data comprises dividing the minimum horizontal stress data by vertical stress data.

Embodiment 27

The computer-implemented method of any prior embodiment, wherein raw data comprise unconfined compressive stress data, and wherein anonymizing the data by non-dimensionalizing the data comprises dividing the unconfined compressive stress data by vertical stress data.

Embodiment 28

The computer-implemented method of any prior embodiment, wherein the analyzing comprises performing a lithology classification for the wellbore operation based at least in part on the anonymized data.

Embodiment 29

The computer-implemented method of any prior embodiment, wherein the analyzing comprises performing a predicting fracture initiation pressure for the wellbore operation based at least in part on the anonymized data.

Embodiment 30

The computer-implemented method of any prior embodiment, wherein anonymizing the raw data is performed in a confidential environment.

Embodiment 31

A system comprising: a memory comprising computer readable instructions and a processing device for executing the computer readable instructions for performing a method for anonymizing data, the method comprising: receiving, by a processing device, raw data from a wellbore operation, wherein the raw data are associated with depths; anonymizing, by the processing device, the raw data to convert the raw data to anonymized data by normalizing the raw data to ensure that a numeric range of the raw data are comparable and by non-dimensionalizing the data to remove units from the raw data; analyzing, by the processing device, the anonymized data; and performing an action at the wellbore operation based at least in part on the analysis of the anonymized data.

Embodiment 32

The system of any prior embodiment, wherein the anonymized data comprises first anonymized data, and wherein analyzing the first anonymized data comprises combining the first anonymized data with second anonymized data

Embodiment 33

The system of any prior embodiment, wherein the first anonymized data is associated with a first wellbore operation and the second anonymized data is associated with a second wellbore operation.

Embodiment 34

The system of any prior embodiment, wherein the first anonymized data is anonymized in a first confidential environment, and the second anonymized data is anonymized in a second confidential environment.

The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure can be used in a variety of well operations. These operations can involve using one or more treatment agents to treat a formation, the fluids resident in a formation, a wellbore, and/or equipment in the wellbore, such as production tubing. The treatment agents can be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A computer-implemented method for anonymizing data, the method comprising:
   receiving, by a processing device, raw data from a wellbore operation, wherein the raw data are associated with depths;
   anonymizing, by the processing device, the raw data to convert the raw data to anonymized data by shuffling the raw data and removing the association with the depths;
   analyzing, by the processing device, the anonymized data; and
   performing an action at the wellbore operation based at least in part on the analysis of the anonymized data.

2. The computer-implemented method of claim 1, wherein the analyzing comprises performing a lithology classification for the wellbore operation based at least in part on the anonymized data.

3. The computer-implemented method of claim 2, wherein the lithology classification is a binary lithology classification.

4. The computer-implemented method of claim 2, wherein the lithology classification is a multi-class lithology classification.

5. The computer-implemented method of claim 1, wherein the raw data comprise gamma ray data, density data, and resistivity data.

6. The computer-implemented method of claim 1, wherein anonymizing the raw data further comprises removing header information from the raw data.

7. The computer-implemented method of claim 1, wherein the raw data comprises stress data, and wherein anonymizing the raw data further comprises converting the stress data to equivalent gradients.

8. The computer-implemented method of claim 1, further comprising:
   deanonymizing, by the processing device, the anonymous data to generate results data.

9. The computer-implemented method of claim 8, wherein deanonymizing the anonymous data to generate the result data comprises applying a key to the anonymous data to generate the results data.

10. The computer-implemented method of claim 1, wherein performing the action at the wellbore operation comprises performing at least one of a drilling action, a completion action, and a production action.

11. The computer-implemented method of claim 1, wherein anonymizing the raw data is performed in a confidential environment.

12. A system comprising:
   a memory comprising computer readable instructions; and
   a processing device for executing the computer readable instructions for performing a method for anonymizing data, the method comprising:
      receiving, by the processing device, first raw data from a first wellbore operation, wherein the first raw data are associated with first depths;
      receiving, by the processing device, second raw data from a second wellbore operation, wherein the second raw data are associated with second depths;
      anonymizing, by the processing device, the first raw data to convert the first raw data to first anonymized data by shuffling the first raw data and removing the association with the first depths;
      anonymizing, by the processing device, the second raw data to convert the second raw data to second anonymized data by shuffling the second raw data and removing the association with the second depths;
      aggregating, by the processing device, the first anonymized data and the second anonymized data to generate aggregate anonymized data;
      analyzing, by the processing device, the aggregate anonymized data; and
      performing an action at the first wellbore operation or the second wellbore operation based at least in part on the analysis of the aggregate anonymized data.

13. The system of claim 12, the method further comprising:
   deanonymizing, by the processing device, the first anonymous data from the aggregate anonymized data to generate first results data by applying a first key to the anonymous data to generate the first results data, wherein the second anonymous data remains anonymous.

14. The system of claim 12, the method further comprising:
   deanonymizing, by the processing device, the second anonymous data from the aggregate anonymized data to generate second results data by applying a second key to the anonymous data to generate the second results data, wherein the first anonymous data remains anonymous.

15. The system of claim 12, wherein anonymizing the first raw data is performed in a first confidential environment, and wherein anonymizing the second raw data is performed in a second confidential environment.

* * * * *